United States Patent Office 3,432,466
Patented Mar. 11, 1969

3,432,466
PROCESS OF MAKING POLY-(2,6-DIARYL-1,4-PHENYLENE ETHERS)
Allan S. Hay, Schenectady, N.Y., assignor to General Electric Company, a corporation of New York
No Drawing. Filed Nov. 14, 1966, Ser. No. 593,733
The portion of the term of the patent subsequent to May 26, 1981, has been disclaimed
U.S. Cl. 260—47      10 Claims
Int. Cl. C08g 23/18, 23/16

ABSTRACT OF THE DISCLOSURE

Oxygen is reacted with a 2,6-diarylphenol at an elevated temperature to produce poly-(2,6-diaryl-1,4-phenylene ethers) using an amine-basic cupric salt complex as the oxygen carrying intermediate. These polymers are useful for making films, fibers, molded objects, electrical insulation, protective coatings, etc.

---

The process of this invention is an improvement over the process disclosed and claimed in my copending applications, Ser. Nos. 212,127, now U.S. Patent 3,306,874, and 212,128, now U.S. Patent 3,306,875, both filed July 24, 1962 and assigned to the same assignee as the present invention. The latter patent claims the poly-(2,6-diaryl-1,4-phenylene ethers).

This invention relates to a process of making poly-(2,6-diarylphenylene ethers). More specifically, this invention relates to a process of making such polyphenylene ethers where one of the aryl substituents is phenyl and the other substituent is selected from the group consisting of phenyl, phenyl having 1 to 5 and preferably 1 to 2 $C_{1-8}$ alkyl substituents, biphenylyl, terphenylyl and naphthyl by reacting oxygen with the corresponding 2,6-diarylphenol at an elevated temperature using an amine-basic cupric salt complex as the oxygen carrying intermediate.

As a general class, 2,6-disubstituted phenols are an extremely interesting group of phenols since they are readily oxidatively coupled to form poly-(2,6-disubstituted-1,4-phenylene ethers) or 3,3',5,5'-tetrasubstituted diphenoquinones. These polyphenylene ethers and the process of producing the polyphenylene ethers and diphenoquinones are disclosed and claimed in my above-reference copending applications. In these applications I disclose that phenols in which at least one of the substituents in the positions ortho to the phenolic group has a tertiary α-carbon atom, always produce diphenoquinones as the principal product. Those phenols in which the substituents in both positions ortho to the phenolic hydroxy group are aryl, alkoxy, or aryloxy, also produce diphenoquinones as the principal product, except when these phenols also have a halogen in the para position, in which case they preferentially form the polyphenylene ethers.

In the case of all of the other phenols, polyphenylene ethers or diphenoquinones, were preferentially formed depending upon the reaction conditions. The reaction of oxygen with the phenols in the presence of the catalyst is an exothermic reaction. If the reaction with those phenols, which could form either polyphenylene ethers or diphenoquinones, was initiated at room temperature and the reaction temperature was not allowed to get too hot, then the polyphenylene ethers were preferentially formed. Even under these optimum conditions, a slight amount of the diphenoquinone product could be found in the reaction mixture, even when the yield of polymer was greater than 90% of theory. As either the initial temperature or the temperature during reaction was permitted to increase, the amount of diphenoquinone product, likewise increased. When the temperature of reaction was greater than 80° C., then the amount of diphenoquinone product became the major product. The water of reaction that is formed by the oxidative coupling reaction preferably was removed from the reaction mixture as fast as it was formed, since it did affect the rate of reaction and, if it formed a separate phase, would extract the catalyst from the organic layer.

I have now unexpectedly found that the 2,6-diarylphenols wherein one of the aryl substituents is phenyl and the other substituent is selected from the group consisting of phenyl, $C_{1-8}$ alkyl substituted phenyl, biphenylyl terphenylyl, and naphthyl are a unique group of phenols which, under specific reaction conditions and in the presence of amine-basic cupric salt complexes using specific amines, can be polymerized to very high molecular weight, poly-(2,6-diarylphenylene ethers) as indicated by the fact that they have intrinsic viscosities of at least 0.3 dec. l./g. when measured in chloroform at 25° C. Hereinafter for brevity, intrinsic viscosities will be given only in terms of the numerical value with it being understood, unless stated otherwise, that the units are in dec. l./g., measured in chloroform at 25° C.

The particular reaction conditions are that the temperature must be at least 50° C. and must not exceed 130° C., and preferably is in the range of 60–100° C. The water of reaction must be removed from the reaction mixture essentially as fast as it is formed and the amine-basic cupric salt complex must be formed from a particular and very selected group of amines. This group of amines consists of n-butylamine, di-n-butylamine, tri-n-butylamine, cyclohexylamine, p-menthane-1,8-diamine and amines having the formula

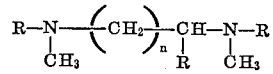

where R is selected from the group consisting of hydrogen and methyl and n is an integer and is at least 1 and not more than 2. Of these amines, the diamines corresponding to the above formula are the preferred class of amines since they will produce poly-(2,6-diaryl-1,4-phenylene ethers) having intrinsic viscosities greater than 0.5, whereas the other amines generally produce poly-(2,6-diaryl-1,4-phenylene ethers) having intrinsic viscosities in the range of 0.3 to 0.5.

It is indeed surprising that these 2,6-diaryl-phenols could be oxidatively coupled under these reaction conditions to produce these high molecular weight poly-(2,6-diaryl-1,4-phenylene ethers) since these are the very conditions under which 3,3',5,5'-tetraaryldiphenoquinones would have been expected to be preferentially produced. Not only are both positions ortho to the pherolic hydroxyl group of the starting phenol substituted with an aryl substituent, but also the temperature is in the range in which diphenoquinones are formed as the major product. Either of these two conditions independently, would have been expected to have produced diphenoquinones, yet. surprisingly enough, both conditions are necessary for the making of high molecular weight poly-(2,6-diaryl-1,4-phenylene ethers). The water of the reaction now should be removed essentially as fast as it is formed in the oxidative coupling reaction, even though it does not form a separate phase, since the presence of water not only decreases the reaction rate but also decreases the intrinsic viscosity of the polymer. In addition, it is surprising that only a very limited number of amines of the entire class useful in the oxidative coupling reaction for other phenols are useful in this process.

Some of the other amines cannot be used because their boiling point is too low, whereas other amines are apparently not oxidatively stable under the reaction conditions. However, even those other amines, including very closely related and homologous amines, which do have a sufficiently high boiling point and are sufficiently oxidatively stable, either produce no polymer at all, or produce polymers of such low molecular weight, that they cannot be fabricated per se into useful articles, although they can be used as plasticizers and modifiers for the high molecular weight polyphenylene ethers. When these low molecular weight polymers are produced, generally, there is also produced a considerable quantity of the corresponding diphenoquinone.

The poly-(2,6-diaryl-1,4-phenylene ethers) have proven to be a very interesting and valuable class of polymers. They are thermoplastic polymers with very high softening points and excellent thermal stability. As produced, all are essentially amorphous or only slightly crystalline materials. This is true of poly-(2,6-diphenyl-1,4-phenelene ethers), but it forms a crystalline polymer when heated above its glass transition temperature (Tg). This tendency to form a crystalline polymer is apparently dependent upon the symmetry of the polymer molecule. Consequently, poly-(2,6-diphenyl-1,4-phenylene ether) can be obtained as a highly crystalline polymer while the other poly-(2,6-diaryl-1,4-phenylene ethers of this invention, because of the unsymmetrical substitution, i.e., two different aryl substituents on the same phenyl nucleus, do not form crystalline polymers. By making copolymers of 2,6-diphenylphenol and one or more of the other 2,6-diarylphenols, this degree of crystallinity of poly-(2,6-diphenyl-1,4-phenylene ether) can be modified.

The very highly crystalline nature of poly-(2,6-diphenyl-1,4-phenylene ether) makes it an extremely interesting polymer since it permits the making of films which can be axially oriented in either one or both of the major dimensions of the film to give extremely strong, flexible films which although thermoplastic have a very high softening point and excellent thermostability. Likewise, fibers spun either by solution or melt processes, can be axilally oriented in the direction of the fiber axis to produce strong fibers with excellent thermal and solvent-resistant properties.

Surprisingly enough poly-(2,6-diphenyl-1,4-phenylene ether), as produced, is essentially amorphous or only slightly crystalline and, as such, is readily soluble in a wide variety of solvents. However, once it is crystallized, the polymer becomes more resistant to almost all solvents in which the amorphous polymer is soluble, except halogenated hydrocarbons, e.g., methylene chloride, tetrachloroethane, etc.

On dissolving, the polymer is reconverted to its amorphous state which permits recovery and reuse of scrap, highly crystalline material.

In my above-identified applications, I have disclosed that when phenols which have aryl substituents in both ortho positions and halogen in the para positions are oxidatively coupled, I then obtain poly-(2,6-diaryl-1,4-phenylene ethers). However, in view of the fact that each atom of halogen, which is removed during the oxidative coupling reaction deactivates one molecule of catalyst, one mole of the amine-basic cupric salt complex must be used for each mole of phenol used, or one equivalent of a strong base must be present for each equivalent of bromine removed in the reaction. The use of such a large amount of a basic-cupric salt complex is very expensive and the use of a strong base complicates the reaction. Furthermore, such a process requires the halogenation of the phenol, an additional process step, yet this halogen is removed during the oxidative coupling reaction so that it is lost as a byproduct and does not contribute to the final weight of the polymer. Because of this it would be highly desirable to produce polyphenylene ethers from 2,6-diarylphenols without the necessity of having to first produce the corresponding 2,6-diaryl-4-halophenol. The process of this invention provides such a means. For the production of films and fibers, the poly-(2,6-diarylphenylene ethers) should have intrinsic viscosities in the order of 0.3. For the making of fibers as films of highest strength, intrinsic viscosities in the order of 0.5 are desirable. Polymers having intrinsic viscosities less than 0.3 do not make films and fibers of sufficient elongation that they can be oriented by stretching, although they can be used for the making of molded objects, used as coatings on substrates, etc. providing they have a number average molecular weight of at least 10,000. Solutions of poly-(2,6-diphenyl-1,4-phenylene ether) having intrinsic viscosities less than 0.3 have a greater tendency than the higher molecular weight polymer to crystallize and precipitate from solution on standing.

The overall oxidation reaction to which my invention is directed is a reaction involving the hydrogen atom of the phenolic hydroxyl group and the hydrogen in the para position of the 2,6-diarylphenol molecule and oxygen with the formation of water, so that the polymer consists of repeating units whereby the oxygen on one benzene ring is joined to the para position of the adjoining benzene ring, i.e., the polymer has the formula

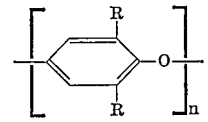

where the two R's represent the two aryl groups of the starting phenol and $n$ is the number of repeating units in the polymer molecule and, generally is sufficiently large that the number average molecular weight of the polymer is at least 10,000. In the oxidation reaction, the reaction does not involve direct oxidation by the oxygen but rather is an oxidation reaction involving participation of the copper catalyst system as an oxygen-carrying intermediate.

The general method of carrying out my oxidation process is to pass an oxygen-containing gas through a solution of one or more 2,6-diaryl-substituted phenols in a solvent which is inert under the reaction conditions and is capable of dissolving the starting phenol, the poly-(2,6-diaryl-1,4-phenylene ether) product and the amine-basic cupric salt complex.

The phenols which can be used in my process are those 2,6-diarylphenols in which one aryl substituent is phenyl and the other aryl substituent is phenyl, $C_{1-8}$ alkyl-substituted phenyl, biphenylyl, terphenylyl, or naphthyl. Typical examples of $C_{1-8}$ alkyl-substituted phenyl substituents which may be present on the phenol are: 2-methylphenyl, 3-methylphenyl, 4-methylphenyl, 2,4-dimethylphenyl, 2,5-dimethylphenyl, 2,4,6-trimethylphenyl, 2,3,4,6 - tetramethylphenyl, 2,3,4,5,6 - pentamethylphenyl, 2-propylphenyl, 2,4-dipropylphenyl, 4-isopropylphenyl, 4-t-butylphenyl, 2-n-butylphenyl, 3-isobutylphenyl, 2,3-di-n-butylphenyl, the isomeric mono- and dihexylphenyls, the isomeric mono- and di-octylphenyls, etc. The biphenylyl may be ortho, meta or para-biphenylyl and the terphenylyl may be any of the isomeric terphenylyls; for example, the o-terphenylyl, m-terphenylyl, and p-terphenylyl which alternatively may be named as diphenyl-substituted phenyls; for example, 2,3-diphenylphenyl, 2,4-diphenylphenyl, 2,5-diphenylphenyl, 2,6-diphenylphenyl, 3,4-diphenylphenyl, 3,5-diphenylphenyl, 2-(o-biphenyl)phenyl, 2-(m-biphenyl)phenyl, 2-(p-biphenyl)phenyl, 3-(o-biphenyl)phenyl, etc. The naphthyl may be either α- or β-naphthyl.

Typical of some of the phenols of the 2,6-diaryl-substituted phenols of this invention having the above substituents are, by way of example: 2-phenyl-6-(2-methylphenyl)phenol, 2-phenyl-6-(3-methylphenyl)phenol, 2-phenyl-6 - (4 - methylphenyl)phenol, 2 - phenyl - 6-(2-propylphenyl)phenol, 2-(4 - isopropylphenyl) - 6 - phenylphenol, 2-(2 - butylphenyl) - 6 - phenylphenol, 2-(4-t-butylphenyl) - 6 - phenylphenol, 2-(2 - hexyl-phenyl)-6-phenylphenol, 2 - phenyl - 6 - (4-octylphenyl)phenol, 2-(o-biphenylyl) - 6 - phenylphenol, 2 - (m-biphenylyl)-6-phenylphenol, 2 - (p - biphenylyl) - 6 - phenylphenol, 2-butylphenyl) - 6 - phenylphenol, 2 - (2 - hexylphenyl)-6-phenyl - 6 - (3-o-terphenylyl)phenol, i.e., 2-(2,3-diphenylphenyl) - 6 - phenylphenol, 2 - phenyl - 6 - (4 - m - terphenylyl)phenol, i.e., 2 - (2,4 - diphenylphenyl)-6-phenylphenyol, 2-phenyl - 6 - (4 - p - terphenylyl)phenol, 2-(α-naphthyl)-6-phenylphenol, 2-(β-naphthyl)-6-phenylphenol, etc. These phenols and a method of producing them are disclosed and claimed in my copending application, Ser. No. 546,508, filed May 2, 1966, and assigned to the same assignee as the present invention.

In providing the catalyst comprising a basic cupric salt and the amine, the particular salt used has little effect on the type of product obtained. However, the copper salt must be one which will be soluble in the reaction mixture. Cuprous chloride and cuprous bromide are the most readily available cupric salts and therefore, preferred. Cuprous bromide appears to be somewhat more soluble and therefore, a somewhat more active catalyst than cuprous chloride. It, therefore, is the preferred catalyst to use when the highest molecular weight polymers are desired.

I may start with either the copper being in the cupric or cuprous state. I likewise may use other cupric or cuprous salts in forming my catalyst system. The only requirement is that of a cuprous salt is used, it must be capable of existing in the cupric state and must form a complex with the amine that is soluble in the reaction medium. The necessity for being able to exist in the cupric state is based on my belief that the oxidation of the 2,6-diarylphenol is accomplished by the oxygen reacting with the amine-cuprous salt complex to form as an intermediate, an activated, amine-basic cupric salt complex that reacts with the 2,6-diarylphenol to form an unstable intermediate which decomposes to form the polymeric product of the 2,6-diarylphenol and water as the products and regenerates the amine-cuprous salt complex. This activated complex can also be formed by starting originally with a cupric salt in making the copper amine complex, for example, by using a reducing agent which unites with the liberated anion and forms the cuprous salt in situ, e.g., copper metal. However, more simple methods may be used, for example, the activated complex may be formed by adding cupric hydroxide to a cupric salt, adding a base to a cupric salt, adding an alkaline salt of a phenol (which preferably is the phenoxide of the 2,6-diarylphenol reactant) to a cupric salt, by treating a cupric salt with an ion-exchange resin having exchangeable hydroxyl groups, etc. Preferably, these reactions are carried out in the presence of the amine to prevent precipitation of the basic cupric salt, but it is possible to add the amine later to dissolve the basic cupric salt, even as a precipitate.

The amount of hydroxyl ion introduced into the complex should not be sufficient to convert the cupric salt to cupric hydroxide unless additional cupric salt is added later. It is desirable when starting with a cupric salt to add one equivalent of base for each mole of copper salt to most effectively use all of the copper. If less base is used then only the equivalent amount of copper salt is converted to the catalytically active amine-basic cupric salt complex leaving the balance of the cupric salt unchanged which even in the form of its amine complex is an inactive ingredient in the system. Likewise, if more than one equivalent of base is added, then some or all of the cupric salt is converted into cupric hydroxide which likewise is an inactive ingredient even in the form of its amine complex. In effect, the addition of more or less than one equivalent of base, i.e., one mole of hydroxyl ion to a mole of cupric salt, results in the same effect as though less of the cupric salt had been used to form the amine-basic cupric salt complex. This same effect is noted if more than one equivalent of acid, i.e., one mole of hydrogen ions or one mole of a cupric salt is added to one mole of cupric hydroxide in forming the complex.

The complex formed from a cuprous salt and the amine can react with oxygen to form an oxidized intermediate while the complex formed from a cupric salt is already in the form of the oxidized intermediate which in some manner can form a complex with the 2,6-diarylphenol. This latter complex activates the aryl nucleus in some way so that the polymeric chains are formed, with the regeneration of the catalyst in the reduced or cuprous state which can react with additional oxygen to form the active oxidized intermediate. This belief is based on the fact that, if I pass oxygen into my catalyst system prepared from a cuprous salt until it is saturated, or treat one equivalent of a cupric salt with one equivalent of a base and then add the 2,6-diarylphenol, with no further addition of oxygen, one mole of 2,6-diarylphenol is oxidized for each two moles of catalyst present. By such a reaction, I can cause the oxidative coupling of the 2,6-diarylphenols to polymers without actually passing oxygen into the reaction system containing the phenol.

In the specification and claims, I use the term "amine-basic cupric salt complex" to denote the catalytically active complex described above which acts or is used as the oxygen-carrying intermediate in the oxidation of the 2,6-diarylphenols to poly-(2,6-diaryl-1,4-phenylene ethers). As shown above, this complex can be obtained either from cuprous or cupric salts and oxidizes the 2,6-diarylphenols to polymeric products while the copper in the complex is reduced to the cuprous state.

If the quantity of 2,6-diarylphenol to be reacted is greater than can be oxidized by the amount of complex present, oxygen is introduced into the reaction mixture to reoxidize the cuprous complex back to the basic cupric complex. Whether this is done or whether the stoichiometric amount of the amine-basic cupric salt complex is used to oxidize the phenol, the net overall reaction in either case is the reaction of oxygen, either elemental or from the complex, with the phenol. This reaction, therefore, may best be described as the reaction of 2,6-diarylphenols with oxygen using the amine-basic cupric complex as the oxygen-carrying intermediate.

Although mixtures of amines and mixtures of copper salts may be used, no benefit would accrue from such use. Preferably, the copper complex is dissolved in the solvent containing the 2,6-diarylphenol reactant using a cuprous salt. In some cases the dissolving of a cuprous salt, if it is used, may be hastened by heating the mixture, by bubbling in air or oxygen, or a combination thereof.

When less than the stoichiometric amount of the described amine-basic cupric salt complex is used, oxygen or an oxygen-containing gas is bubbled into the reaction mixture causing the reaction to take place with the formation of water as a by-product. Since this method permits the same products to be formed but uses less quantities of the complex, I prefer to use this method.

Typical examples of the copper salts suitable for my process are cuprous chloride, cupric chloride, cuprous bromide, cupric bromide, cuprous sulfate, cupric sulfate, cuprous azide, cupric azide, cuprous tetraammine sulfate, cupric tetraammine sulfate, cuprous acetate, cupric acetate, cuprous propionate, cupric butyrate, cuprous palmitate, cupric laurate, cuprous benzoate, cupric toluate, etc. Cuprous chloride, cupric chloride, cuprous bromide, cupric bromide, cuprous azide and cupric azide produce the highest molecular weight polymers. Although cupric sulfite is not known, cuprous sulfite can be used because it evidently is oxidized to cuprous sulfate. Copper salts such as cuprous iodide, cuprous sulfide, cupric sulfide, cuprous cyanide, cuprous thiocyanate, etc., are not suitable for use in my process, since they are either not soluble in tertiary amines or are not capable of existing as stable cupric salts. For example, cupric cyanide and cupric thiocyanate autogeneously decompose to the corresponding cuprous salt. Cuprous nitrate and cuprous fluoride are not known to exist but the amine complexes can be made in situ. Substitution of cupric chloride, cupric bromide, cupric sulfate, cupric perchlorate and cupric nitrate for the cuprous salt, without first converting them to the corresponding basic cupric salt, gave no oxidiation of 2,6-diarylphenols.

In addition to the specific amines named above, examples of amines which I may use and are included by the formula are N,N,N',N'-tetramethylethylenediamine, N,N'-dimethylethylenediamine, N,N,N',N' - tetramethyl-1,3-propanediamine, N,N,N',N'-tetramethyl-1,2-propanediamine, N,N'-dimethyl - 1,3 - propanediamine, N,N'-dimethyl-1,2-propanediamine, N,N,N',N' - tetramethyl-1,3-butanediamine and N,N'-dimethyl1,3-butanediamine.

As has been indicated previously, the diamines give an amine-copper complex which is more reactive and produces higher molecular weight products than the other specific amines. However, with any one complex, the reactivity is dependent upon the phenol-to-copper ratio, i.e., the ratio of the moles of phenol to moles of copper. The lower the ratio, the more rapidly the reaction occurs. It is to be understood that the phenol referred to is the 2,6-diarylphenol starting material.

One way of accomplishing a lower phenol-to-copper ratio without actually using a larger amount of copper for the total 2,6-diarylphenol reacted, is to add the 2,6-diarylphenol slowly to the soltuion of the amine-basic cupric salt complex solution through which oxygen is being bubbled. In this way there is very little unreacted 2,6-diarylphenol present in the reaction mixture and therefore the phenol-to-copper ratio is much lower than if all the 2,6-diarylphenol were added at once. I have noticed that when I carry out the preparation of polyphenylene ethers by this means, the amount of tetraaryldiphenoquinone formed decreases. However, even under the optimum conditions, some tetraryldiphenoquinone is formed in small amounts, i.e., a few percent, most of which precipitates from the reaction mixture and can be removed by filtration. The small amount remaining in solution can be washed from the polymer after precipitation by means of hot methanol or reduction to the corresponding biphenol with a reducing agent, i.e., hydrazine, etc.

The amine-to-copper ratio is also critical. This criticality is based on the actual nitrogen (from the amine) to copper ratio. This apparently is based on the fact that all of the copper must be in the form of a complex to be active, but there should not be a great excess of amine over the amount necessary to complex copper. Generally, one copper atom is completely complexed for each two amine nitrogen atoms, i.e., when the nitrogen-to-copper ratio is 2 to 1. Usually, when the amine-to-copper ratio exceeds 2 to 1, the reaction rate as well as the molecular weight of the poly-(2,6-diaryl-1,4-phenylene ethers) is decreased. However, p-methane-1,8-diamine appears to give best results when used at an amine-to-copper ratio of 4 to 1. The other amines give best results at amine-to-copper ratios between 1 to 1 and 2 to 1 but can be used at greater than 2 to 1 when the highest molecular weight polymers are not desired, but in no case should the ratio exceed 5 to 1. Although a nitrogen-to-copper ratio of less than 1 to 1 may be used, this does not effectively utilize all of the copper, since at least one nitrogen atom is required for every copper atom complexed. Therefore, the use of a nitrogen-to-copper ratio of less than 1 to 1, retards the rate of reaction.

A nitrogen-to-copper ratio of 1 to 1 sometimes appears to be desirable for producing higher molecular weight products when the phenol-to-copper ratio is relatively low, i.e., the ratio of 40 moles of 2,6-diarylphenol to 1 mole of copper, whereas a nitrogen-to-copper ratio of 2 to 1 appears to be most effective when the phenol-to-copper ratio is relatively high, i.e., in the range of 200 to 400 moles of phenol per mole of copper.

Both the amine-to-copper and phenol-to-copper ratio discussed above appear to be independent of the actual concentration of the 2,6-diarylphenol initially present in soltuion. However, the concentration of the 2,6-diarylphenol in solution should not be so great that when the poly-(2,6-diaryl-1,4-phenylene ether) is formed, the solution becomes so viscous in the latter stages of the reaction that proper contact of the reactants with oxygen is impeded. Generally, I prefer that the concentration be so chosen that the concentration of the poly-(2,6-diaryl-1,4-phenylene ether) in solution at the end of the reaction is in the range of 5 to 20 weight percent.

It also appears that in order to obtain the highest molecular weight products, i.e., having the highest intrinsic viscosity, that the reaction conditions should be so chosen that the reaction proceeds as rapidly as possible. In other words, to obtain the highest molecular weight products, it is desirable to optimize the temperature of the reaction, the catalyst concentration, the ratio of 2,6-diarylphenol to copper, the amine-to-copper ratio, etc. As is usual with polymerization reactions, highest molecular weights linear polymers are obtained from the highest purity 2,6-diarylphenol. However, inert impurities, e.g., terphenyl in 2,6-diphenylphenol, have little if any effect when present as impurities. Also, the use of oxygen over air or other oxygen-containing gases, likewise, seems to aid in obtaining the highest molecular weight products. The polymers of lower intrinsic viscosity can be used as starting material in the reaction and oxidized to polymers having a higher intrinsic viscosity.

Any solvent may be used which will maintain the polymer and the catalyst in solution throughout the reaction. Benzene, chlorobenzene and dichlorobenzene are suitable and readily available solvents. Toluene and xylene, unfortunately are not capable of dissolving the higher molecular weight poly-(2,6-diaryl-1,4-phenylene ethers). However, they may be used in conjunction with benzene providing the amount used does not cause insolubility of the polymeric product. Toluene can be used as a solvent for polymers having intrinsic viscosities in the range of 0.3–0.4, but is not as desirable as benzene. Because it is essential to remove the water of reaction as fast as it is formed, I generally preferred to choose my solvent so that at the temperature I use for carrying out the reaction, the water can readily be removed by entrainment in the solvent vapors, for example, by azeotropic distillation, or where the solvent used has a boiling point higher than water, by distillation of the water from the reaction mixture, if no azeotrope is formed with the solvent or by evaporation of the water by the flow of the oxygen-containing gas through the reaction mixture with or without evaporation of some of the solvent.

Entrainment separation of the water of reaction is preferable over the use of a solid drying agent in the reaction mixture since the drying agents tend to absorb some of the amine-basic cupric salt complex and therefore, tend to slow down the reaction. Therefore, when solid drying agents are used, care should be exercised to make sure that not too much of the complex is absorbed and that sufficient of the complex is present that the reaction proceeds in a satisfactory fashion. Furthermore, care should be taken that the temperature used in carrying out the reaction, when a solid drying agent is used, is not so high that it effectively releases any water which does get bound up by the drying agent, i.e., a temperaure which would cause thermodecomposition of any hydrates or other compounds formed between the drying agent and the water. The use of drying agents can be beneficial in the lower part of the temperature range where evaporation or distillation of the water is not sufficiently rapid.

Temperatures of at least 50° C. are required even with the special conditions of catalyst outlined above, to obtain poly-(2,6-diaryl-1,4-phenylene ethers) having intrinsic viscosities greater than 0.3. Lower temperatures, even with the other reaction conditions being optimized, only produce polymers having lower intrinsic viscosities along with a substantial amount of the diphenoquinone. Temperatures greater than 130° C. preferably are not used since higher temperatures also result in polymers having intrinsic viscosities less than 0.3. Preferably, the temperature is in the range of 60–100° C. since highest molecular weight products are obtained in this range.

Ordinarily, the passage of oxygen into the reaction mixture is continued until no increase in viscosity of the reaction mixture is noted, or the desired amount of oxygen is absorbed. Alternatively, I may intermittently or continuously add the same or a different 2,6-diarylphenol than the starting material during the oxidation reaction.

To terminate the reaction, I destroy the catalyst system by addition of an acid preferably a mineral acid, such as hydrochloric or sulfuric acid, or a base, for example, lime, sodium hydroxide, potassium hydroxide, etc., which reacts with the complex of the amine and basic cupric salt, or I remove the product from the presence of the catalyst by pouring the reaction mixture into a material which is a solvent for the catalyst system but a nonsolvent for the product. Alternatively, I may precipitate the copper as an insoluble compound and filter it from the solution prior to isolating the product or I may add a chelating agent which inactivates the copper, or I may pass the solution over an adsorbent for the catalyst and other byproducts. After the product is precipitated, it may be redissolved and reprecipitated any desirable number of times to remove impurities. Finally, it is filtered and washed free of any remaining contaminants. When dry, the product can be fabricated into useful products by molding, extrusion, melt spinning, etc., or it may be dissolved in solvents to prepare solutions which can be used in the preparation of coatings, fibers, adhesives, etc.

In order that those skilled in the art may understand my invention better, the following examples are given which are illustrative of the practice of my invention and are not intended for purposes of limitation. In the examples, all percentages are by weight unless otherwise stated. Intrinsic viscosities which were measured in chloroform at 30° C. are not significantly different from the values which would have been obtained if they had been measured at 25° C.

GENERAL PROCEDURE

The general procedure used in Examples 1–4 was to use an open 250 ml. wide-mouthed Erlenmeyer flask equipped with a high speed vibrating mixer, thermometer and oxygen inlet tube. This flask was immersed in an oil bath and heated to the desired temperature. The reaction mixture consists of 9.84 g. of 2,6-diphenylphenol (0.04 mole), 125 ml. of the solvent with the amount of copper salt, either cuprous bromide or cuprous chloride, being varied to give the desired phenol-to-copper ratio. The 2,6-diphenylphenol was dissolved in 25 ml. of the benzene and added slowly over the first 15 minutes to the balance of the reaction mixture. The amine was titrated to determine its actual concentration and likewise was varied to give the desired copper-to-amine ratio, as stated in the specific examples. The drying agent, when used, was 6.3 g. of anhydrous magnesium sulfate unless otherwise stated. Oxygen was bubbled through the reaction mixture at a rate of 0.15 cubic feet per hour for reaction times up to 500 minutes. For longer reaction times, requiring that the reaction be run overnight, the oxygen rate was reduced to 0.05 cubic feet per hour during the overnight period in order to minimize the evaporation of the solvent. Fresh solvent was added as needed during daytime running to maintain a constant volume in the reaction mixture. At the end of the reaction time, 2 ml. of concentrated aqueous HCl was added to inactivate the catalysts. The reaction mixture was filtered to remove the drying agent, if present, and any 3,3′,5,5′-tetraphenyldiphenoquinone which had precipitated. The polymer was percipitated by pouring the solution slowly with stirring into 1 liter of methanol. The polymer was washed with hot acetone to dissolve any 3,3′,5,5′-tetraphenyldiphenoquinone adhering to the polymer and the polymer dried.

EXAMPLE 1

In this example, the amine was N,N,N′,N′-tetramethyl-1,3-butanediamine, the copper salt was cuprous bromide, the reaction temperature was 60° C., and the solvent was benzene. The drying agent was anhydrous magnesium sulfate except for the first entry where it was omitted, to illustrate the beneficial effect obtained under these conditions by the use of the drying agent even though at this temperature and oxygen flow rate, water is swept from the reaction mixture along with solvent vapors. The example, likewise, illustrates that it is not desirable to use an amine-to-copper ratio greater than 2 to 1. This example further illustrates that a wide range of ratios of 2,6-diphenylphenol-to-copper can be used. Using the above general procedure, the results obtained are shown in Table I.

TABLE I

| Ratio Cu:N:phenol | Reaction Time | | Percent, Polymer | Intrinsic Viscosity |
|---|---|---|---|---|
| | Hrs. | Min. | | |
| 1:2:40 [1] | 5 | 30 | 84.8 | 0.38 |
| 1:2:40 | 5 | 12 | 89.1 | 0.55 |
| 1:1:40 | 5 | 16 | 91.5 | 0.80 |
| 1:1:20 | 5 | 15 | 96.2 | 0.72 |
| 1:3:40 | 5 | 14 | 91.7 | 0.39 |
| 1:1.5:40: [2] | | | | |
| (a) | 5 | 18 | | 0.64 |
| (b) | 29 | 36 | 94.2 | 0.64 |
| 1:1:80: [2] | | | | |
| (a) | 6 | 12 | | 0.76 |
| (b) | 24 | 0 | 91.7 | 0.84 |
| 1:1:160: [2] | | | | |
| (a) | 47 | 12 | | 0.83 |
| (b) | 55 | 0 | 86.3 | 0.87 |
| 2:1:40: [2] | | | | |
| (a) | 5 | 16 | | 0.78 |
| (b) | 24 | 0 | 94.2 | 0.80 |
| 1:1:40: [2,3] | | | | |
| (a) | 5 | 0 | | 0.86 |
| (b) | 22 | 0 | 91.5 | 0.86 |

[1] Drying agent omitted.
[2] 25 ml. sample taken as (a) and reaction allowed to continue to give (b). Yield is overall yield of both (a) and (b).
[3] Amount of reactants, but not solvent doubled to give a final concentration of polymer of ca. 20%.

EXAMPLE 2

This example illustrates the effect of temperature, i.e., that a temperature of at least 50° C. is necessary, the slight improvement obtained by the use of cuprous bromide over cuprous chloride, the use of various solvents, and the effect of a great excess of amine. In these reactions, the copper-to-nitrogen-to-phenol ratio was held constant at 1:2:40, except for the two entries marked with an asterisk (*). Two different amines were used, N,N,N′,N′-tetramethylethylenadiamine (TMEDA) and N,N,N′,N′-tetramethyl-1,3-butanediamine (TMBDA).

Table II shows the results obtained using the general procedure except that all of the ingredients were present in the reaction vessel from the start.

TABLE II

| Amine | Cu Salt | Temp., °C. | Solvent | Time Hrs. | Time Min. | Percent, Polymer | Intrinsic Viscosity |
|---|---|---|---|---|---|---|---|
| TMEDA | CuBr | 25 | Toulene | 22 | 22 | 61.6 | 0.03 |
| TMEDA [1] | CuBr | 60 | do | 3 | 28 | 90.0 | 0.39 |
| TMBDA [1] | CuCl | 60 | do | 4 | 26 | 89.2 | 0.36 |
| TMBDA | CuCl | 60 | do | 4 | 58 | 90.0 | 0.37 |
| TMBDA | CuCl | 60 | do | 3 | 28 | 93.9 | 0.31 |
| TMBDA [1] | CuCl | 50 | do | 24 | 15 | 87.2 | 0.35 |
| TMBDA* | CuCl | 50 | do | 3 | 6 | 87.3 | 0.14 |
| TMBDA* | CuCl | 60 | do | 2 | 32 | 92.3 | 0.18 |
| TMBDA | CuBr | 60 | do | 5 | 8 | 91.8 | [2] 0.50 [3] 0.45 |
| TMBDA | CuBr | 60 | Chlorobenzene | 24 | 40 | 91.2 | 0.55 |
| TMBDA | CuBr | 60 | Diphenyl ether | 5 | 5 | 90.4 | 0.47 |
| TMBDA | CuBr | 60 | Benzene [4] | 6 | 43 | 88 | 0.63 |

[1] Drying agent omitted.
[2] Sample removed after 2 hours, 47 minutes.
[3] Balance of polymer recovered.
[4] Reflux condenser used to avoid loss of solvent.
*Cu amine:2,6-diphenylphenol ratio was 1:10:40.

EXAMPLE 3

This example illustrates the use of other amines including the use of closely related amines which do not work. In the table the following abbreviations are used for the various amines. TMEDA is N,N,N',N'-tetramethylethylenediamine; TMBDA, N,N,N',N'-tetramethyl-1,3-butanediamine; DMEEDA, N,N-dimethyl-N'-ethylethylenediamine; DMPDA, N,N'-dimethyl-1,3-propanediamine; 1,4-TMBDA, N,N,N',N'-tetramethyl-1,4-butanediamine; TMHDA, N,N,N',N'-tetramethyl-1,6-hexanediamine; TMMDA, N,N,N',N'-tetramethylmethylenediamine; DEEDA, N,N'-diethylethylenediamine; EDA, ethylenediamine; DBA, di-n-butylamine; BA, n-butylamine; DMSA, N,N-dimethylstearylamine. The reactions were carried out as described in the general procedure using a temperature of 60° C. and magnesium sulfate as a drying agent except for the last entry when 12.3 grams of a molecular sieve was used as a drying agent. The copper:nitrogen:2,6-diphenylphenol ratio was constant at 1:1:40. The copper salt used was CuBr. The results are shown in Table III.

TABLE III

| Amine | Reaction Time Hrs. | Reaction Time Min. | Percent, Polymer | Intrinsic Viscosity |
|---|---|---|---|---|
| TMEDA | 22 | 0 | 89.8 | 0.84 |
| TMBDA | 22 | 20 | 92.1 | 0.78 |
| DMEEDA | 24 | 0 | 81.7 | 0.10 |
| DMPDA | 23 | 0 | 90.0 | 1.13 |
| 1,4-TMBDA | 22 | 0 | 63.4 | 0.06 |
| TMHDA | 23 | 0 | 82.2 | 0.06 |
| TMMDA | 22 | 0 | 44.5 | 0.06 |
| DEEDA | 22 | 0 | No polymer | |
| EDA | 22 | 0 | No polymer | |
| DBA | 24 | 0 | 88.2 | 0.36 |
| BA | 22 | 0 | 87 | 0.37 |
| DMSA | 22 | 0 | 92.2 | 0.26 |

EXAMPLE 4

This example illustrates that almost all of the 2,6-diphenylphenol is converted into a polymer in the early stages of the reaction but that higher intrinsic viscosity is obtained by continuing the reaction after the polymer has formed. In carrying out this reaction, the general procedure was used except a 2-liter, round bottom flask was used and larger quantities of reagents were used to permit the withdrawal of 100 ml. samples. These samples, as soon as they were removed, were treated in the same way as the final reaction product, i.e., they were acidified and precipitated and the polymer washed. The actual proportions of ingredients were 1,400 ml. of benzene, 140 g. of 2,6-diphenylphenol, 70 g. of anhydrous magnesium sulfate, 1.25 ml. (0.0071 mole) of N,N,N',N'-tetramethyl-1,3-butanediamine and 2.02 g. of CuBr, the copper to nitrogen to 2,6-diphenylphenol ratio was 1:1:40. The reaction was carried out at 60° C., using an oxygen flow rate of 1.75 cubic feet per hour. The time the fractions were taken, the yield of polymer recovered from the fractions and the intrinsic viscosity of each of these fractions is shown in Table IV.

TABLE IV

| Fraction | Time, minutes | Yield | Intrinsic Viscosity |
|---|---|---|---|
| 1 | 38 | 1.9 | 0.06 |
| 2 | 56 | 3.0 | 0.05 |
| 3 | 159 | 9.73 | 0.24 |
| 4 | 174 | 9.82 | 0.32 |
| 5 | 178 | 10.01 | 0.37 |
| 6 | 181 | 9.6 | 0.41 |
| 7 | 198 | 9.77 | 0.50 |
| 8 | 220 | 59.6 | 0.60 |

The fraction marked "fraction 8" was the balance of the reaction mixture at the time the reaction was stopped. The yield is given in grams of polymer for each fraction. The small variations in yield after 159 minutes are not significant since small losses occur in isolation of the polymer, but it is significant that the yield of polymer definitely increases during the first 2–3 hours of reaction.

EXAMPLE 5

This example illustrates the use of azeotropic distillation to remove the water while returning the refluxing solvent to the reaction mixture. In this example, a three-neck 500 ml. round bottom flask was provided with a sealed mechanical stirrer and thermometer, a heated addition funnel, an oxygen inlet and a reflux condenser having as its lower extremity a Dean-Stark trap for trapping the water while permitting the solvent to be returned to the reaction vessel. The connections between the reactor and trap were heated with electrical heating tape to prevent premature condensation of the vaporized liquids. A solution of 50 g. of 2,6-diphenylphenol, 0.07 g. of cuprous bromide and 0.07 g. of N,N,N',N'-tetramethylethylenediamine in 75 ml. of benzene was prepared under nitrogen atmosphere at 60–70° C. This solution was transferred to the addition funnel and added dropwise over a period of 27 minutes to 175 ml. of benzene in the reaction flask, heated at 65° C. Oxygen was passed through the reaction mixture at the rate of 500 cc. per minute during the addition and for 105 minutes after addition was complete. The viscous reaction mixture was diluted with 250 ml. of benzene, entrifuged and the clear supernatant liquid added to 1500 ml. of methanol. The precipitated polymer was filtered, washed and dried overnight at 105° C., yielding 46.1 g. polymer having intrinsic viscosity of 1.0 measured at 30° C.

In the same manner, 30 g. of 2,6-diphenylphenol, 0.22 g. of CuBr and 0.4 g. of cyclohexylamine and 50 ml. of benzene was added over a 22 minute period to 100 ml. of benzene and reacted for an additional two hours. There was obtained 27.7 g. of the polymer having an intrinsic viscosity of 0.3, measured at 30° C.

In another run, in a smaller reaction flask, 5.0 g. of 2,6-diphenylphenol, dissolved in 30 ml. of o-dichlorobenzene was added over a 12 minute period to a solution of 0.07 g. of CuBr and 0.17 g. of p-menthane-1,8-diamine in 100 ml. of o-dichlorobenzene maintaining a temperature in the range of 90–95° C. After 2½ hours reaction, the polymer was first precipitated by pouring into methanol and then reprecipitated from a chloroform solution by pouring into methanol. The yield was 4.3 g. of polymer, having intrinsic viscosity of 0.32, measured at 30° C. When this latter reaction was repeated using 50 g. of 2,6-diphenylphenol, 0.21 g. CuBr and 0.697 gram of p-menthane-1,8-diamine using 75 ml. of chlorobenzene to dissolve the 2,6-diphenylphenol and 175 ml. of chlorobenzene in the reaction vessel with the reaction being carried out at 100° C. for 2 hours, there was obtained 46.5 g. of polymer having intrinsic viscosity of 0.43.

EXAMPLE 6

A solution of 30 g. of 2,6-diphenylphenol in 50 ml. of warm benzene was prepared and blanketed with nitrogen. To this solution, 0.045 g. of CuBr and 0.045 g. of N,N,N',N'-tetramethyl-1,2 - propanediamine was added. Solution was effected by stirring for about 20 minutes under a nitrogen atmosphere. Using the equipment described in Example 5, this warm solution was transferred to the addition funnel and added over a period of 20 minutes to 100 ml. of benzene in the reactor pot heated to 65° C. while vigorously stirring. Oxygen was passed into the reaction mixture at the rate of 500 cc. per minute, during the addition and for an additional 2½ hours.

At the end of this reaction period, 100 ml. of benzene was added and the solution centrifuged to remove approximately 2 g. of 3,3',5,5'-tetraphenyl-4,4'-diphenoquinone. The polymer solution was added to an excess of methanol which was stirred vigorously. The polymer was filtered from the solution, washed with methanol and dried. Yield 26.5 g., intrinsic viscosity at 30° C. 0.85.

EXAMPLE 7

Air may be used in the place of oxygen but the reaction rate is much lower even though the flow rate of air is 5 times the flow rate of oxygen. As an example, when all of the reactants and reaction conditions were the same, the use of oxygen produced a polymer having an intrinsic visosity of 1.04 in 6 hours and 15 minutes, whereas using a flow rate of air 5 times that of the flow rate of oxygen, the intrinsic viscosity of the polymer obtained after 9 hours and 15 minutes, reaction time was 0.56, thus indicating that air could be used but oxygen is preferred.

EXAMPLE 8

This example illustrates the production of poly(2,6-diaryl-1,4-phenylene ethers) in which one of the aryl substituents is other than phenyl. The particular 2,6-diarylphenols used were prepared as disclosed in my copending application, Ser. No. 546,508, filed May 2, 1966 and assigned to the same assignee as the present invention. A solution of 1.0 g. of 2-phenyl-6-(4-t-butylphenyl)phenol, 0.006 g. CuCl and 0.004 g. of N,N,N',N'-tetramethylethylenediamine in 50 ml. of benzene was placed in a reaction vessel fitted with an oxygen inlet tube a reflux condenser having a Dean-Stark trap and stirrer. The reaction vessel was heated by partial immersion in an oil bath at 80° C. Oxygen was bubbled vigorously through the reaction mixture for 8 hours. The polymer was precipitated by pouring the reaction mixture into an excess of methanol, filtering, redissolving in chloroform and reprecipitating by pouring into methanol. This polymer had intrinsic viscosity of 0.36. Under these same conditions, the polymer from 2,6-diphenylphenol has an intrinsic viscosity of 0.59 and the polymer from 2-phenyl-6-(4-methylphenyl)phenol has intrinsic viscosity of 0.41.

The polymers from 2-phenyl-6-(4-t-butylphenyl)-phenol and 2-phenyl-6-(4-methylphenyl)phenol were analyzed. The determined values are followed by the theoretical values in parentheses. The polymer from the 2-phenyl-6-(4-t-butyl-phenyl)phenol was found to have carbon 87.8, 87.9(87.96), H, 6.7, 6.7(6.71) and the polymer from 2-phenyl-6-(4-methyl-phenyl)phenol was found to have C, 88.2, 88.4 (88.34), H, 5.5, 5.7 (5.46). Polymers were also prepared from the following 2,6-diarylphenols and found to have the following elemental analysis shown in the following Table V.

TABLE V

| Polymer from— | C | H |
| --- | --- | --- |
| 2-phenyl-6-(α-naphthyl)phenol | 89.6, 89.7 (89.77) | 4.7, 4.7 (4.79) |
| 2-phenyl-6-(o-biphenylyl)phenol | 90.2, 90.2 (89.97) | 4.8, 5.0 (5.03) |
| 2-phenyl-6-(2,3-diphenylphenyl) phenol, alternatively named 2-phenyl-6-(3,o-terphenylyl) phenol | 90.7, 90.9 (90.88) | 5.0, 5.1 (5.09) |
| 2-phenyl-6-(2-methylphenyl) phenol | 88.1, 88.2 (88.34) | 5.5, 5.6 (5.46) |

All of these polymers, except the polymer from 2,6-diphenylphenol, were readily molded at 300° C. and 5,000 lbs./square inch pressure into films with no evidence of the polymer crystallizing during molding. On the other hand, the polymer from 2,6-diphenylphenol when molded under the same conditions, produced a highly crystalline film. To produce a noncrystalline film from the poly-(2,6-diphenyl-1,4-phenylene ether), it is necessary to mold the polymer in the range from 250 to 260° C. at a pressure of 10,000 lbs. per square inch and rapidly cool the film after molding.

In order to see whether copolymers from 2,6-diphenylphenols and the above phenols could be prepared which would be noncrystalline when molded into films, copolymers were made in which each of the above unsymmetrically substituted phenols were copolymerized with 2,6-diphenylphenol in the amounts of 1, 5 and 10 mole percent of the unsymmetrically substituted phenol to 99, 95 and 90 mole percent, respectively, of 2,6-diphenylphenol. These copolymers were pressed into films at 300° C. under 5,000 lbs. per square inch pressure with all the polymers producing crystalline films, except the copolymer prepared from 10 mole percent of 2-phenyl-6-(2,3-diphenylphenyl)phenol and 90 mole percent of 2,6-diphenylphenol. This indicates that to produce polymers which will not crystallize upon molding under such conditions, it will be necessary to use 10 mole percent or more of the unsymmetrically substituted phenol.

EXAMPLE 9

This example illustrates the making of oriented films and fibers from poly-(2,6-diphenyl-1,4-phenylene ethers). In view of the fact that these polymers, as made, are essentially amorphous or only slightly crystalline in nature, but become highly crystalline when heated above their glass temperature, they can only be molded or extruded under high pressure, in the range of 250–260° C., if they are to be obtained in their amorphous state. It is therefore much easier to dissolve these polymers in a solvent and either wet or dry spin the solutions into fibers or solution cast the films.

This example illustrates the use of the solution technique for making both fibers and films. In the making of fiber, a poly-(2,6-diphenyl-1,4-phenylene ether) having intrinsic viscosity of 1.08 was dissolved to form a 10 percent solution in a solvent mixture of 80% methylene chloride and 20% trichloroethylene. After filtering, through progressively finer filters, final pore size 0.22 micron, the solution was concentrated under vacuum to 22% solids. The solution was spun through a spinneret into a tower heated to 45° C. Samples of these fibers were drawn to various amounts while passing over a 6 inch plate heated to 235° C. at the rate of 20 ft. per minute. The relation of tenacity and elongation is shown in Table VI for various draw ratios, i.e., ratio of final stretched length to original length.

TABLE VI

| Draw Ratio | Tenacity, g./denier | Elongation, Percent |
|---|---|---|
| 1:1 (unstretched) | 0.5 | 6 |
| 2:1 | 1.0 | 88 |
| 4:1 | 1.7 | 27 |
| 5:1 | 2.2 | 16 |
| 6:1 | 2.6 | 12 |
| 7:1 | 3.3 | 12 |

Those fibers which were stretched at least 5 times their original length were stable when reheated. Fibers having tenacity as high as 6+g./denier have been obtained. Table VII gives the range of tenacities as a function of the draw ratio for a series of fibers having different histories.

TABLE VII

Draw ratio: Range of tenacity g./denier
- 2:1 _____ 0.8–1.2
- 3:1 _____ 1.3–1.7
- 4:1 _____ 1.6–2.0
- 5:1 _____ 1.8–2.2
- 6:1 _____ 2.6–3.3
- 7:1 _____ 3.0–4.0
- 8:1 _____ 3.7–4.4
- 9:1 _____ 4.4–5.4
- 10:1 _____ 5.6–6.3

Film was prepared from a 20 weight percent solution in methylene chloride of poly-(2,6-diphenyl-1,4-phenylene ether) having intrinsic viscosity of 0.4. This solution was spread on a casting surface and the solvent permitted to evaporate. A series of films were so prepared. Some were biaxially oriented and some were oriented in only one direction. The films were preheated for 20 seconds at 220° C. In biaxially orienting, the films were stretched to twice the original two major dimensions. The films oriented only in one direction were stretched to three times the original dimension. A film which was 0.59-mil thick and which had been biaxially oriented, had a tensile strength at room temperature of 8,900 p.s.i. whereas a film which was 0.93-mil thick and which had been stretched in only one direction, had a tensile strength of 9,400 lbs. per square inch, when measured in the direction in which the film had been stretched. When tested at 200° C., a 1.1-mil thick film which had been biaxially oriented had a tensile strength of 1,850 p.s.i. and a film which was 0.73-mil thick, after orientation in only one direction, had a tensile strength of 1,750 p.s.i.

The effect of the amount of stretching is shown in Table VIII for the film of poly-(2,6-diphenyl-1,4-phenylene ether) stretched varying amounts at a rate of 20 inches per minute at a temperature of 230° C.

Table VIII

Draw ratio: Tensile strength p.s.i
- 2:1 _____ 12,000
- 3:1 _____ 21,000
- 4:1 _____ 22,500
- 5:1 _____ 24,000
- 6:1 _____ 25,400
- 7:1 _____ 28,000
- 8:1 _____ 28,500
- 9:1 _____ 29,100
- 10:1 _____ 32,800

Table IX shows typical results of both monoaxially and biaxially oriented films at different draw ratios for poly-(2,6-diphenyl-1,4-phenylene ethers) having different intrinsic viscosities.

TABLE IX
[M=Monoaxially oriented (tested in direction of stretch); B=Biaxially oriented]

| Intrinsic Viscosity | Draw Ratio | Tensile Strength, p.s.i. | Elongation |
|---|---|---|---|
| 0.60 M at 230° C | 5:1 | 21,000 | 18 |
| | 7:1 | 22,000 | 20 |
| | 9:1 | 28,200 | 23 |
| | 10:1 | 23,400 | 26 |
| 1.35 M at 230° C | 5:1 | 30,000 | 29 |
| | 7:1 | 33,600 | 24 |
| | 9:1 | 41,000 | 22 |
| | 10:1 | 41,000 | 26 |
| 0.55 B at 235° C | 2:1×2:1 | 12–15,000 | 90 |
| 0.65 B at 235° C | 2.5:1×2.5:1 | 15–20,000 | 30 |

Attempts to use intrinsic viscosities below 0.3 for making either films or fibers resulted in products which were not extensible enough to be stretched. These polymers in solution, although initially forming clear solutions, soon precipitated making it almost impossible to use for casting films or spinning fibers. The poly-(2,6-diphenyl-1,4-phenylene ethers) having intrinsic viscosities between 0.3 and about 0.45 do not readily precipitate from solution but do require slower drying to prevent bubbling in making films and fibers, but this can be done. However, these precautions do not need to be taken with those polymers having intrinsic viscosities greater than 0.5. Since such polymers also form the strongest films and fibers, such polymers are preferred.

In addition to making fibers by dry-spinning techniques, fibers have also been made by wet-spinning whereby the solution of the polymer after coming from the spinneret is passed into a liquid which precipitates the polymer as a continuous fiber. Coarse monofilament fibers have also been extruded from melt by use of a temporary volatile plasticizing solvent. Orientation has been accomplished on both films and fibers in heated air, heated transfer liquids as well as during the time while they still contained small amounts of the solvent. Stretch orientation has also been carried out in two steps, each at a different temperature.

Other modifications to this invention and other variations and other procedures may be employed without departing from the scope of this invention.

From data collected from the preparation of many poly-(2,6-diphenyl-1,4-phenylene ethers), I have determined the following correlation of intrinsic viscosities and molecular weight which on a log-log plot produces 2 straight lines. These values are shown in Table X.

TABLE X

| Intrinsic Viscosity | Number Average, M.W. | Weight Average, M.W. |
|---|---|---|
| .25 | $4.2 \times 10^4$ | $5.5 \times 10^4$ |
| 0.30 | $5.4 \times 10^4$ | $7.4 \times 10^4$ |
| 0.50 | $1.1 \times 10^5$ | $1.7 \times 10^5$ |
| 0.75 | $1.9 \times 10^5$ | $3.2 \times 10^5$ |
| 1.00 | $2.8 \times 10^5$ | $5.0 \times 10^5$ |

The glass transition temperatures of the poly-(2,6-diaryl-1,4-phenylene ethers) fall in the range of 210–240° C. The crystal melting temperature of the highly crystalline poly-(2,6-diphenyl-1,4-phenylene ether) is in the range of 475–500° C. with melting of the crystals being evident at the lower temperature and being complete at the higher temperature. In converting the essentially amorphous or slightly crystalline polymer to the highly crystalline polymer, the maximum rate of transformation occurs in the region of 300° C. The maximum degree of crystallinity that has been obtained is about 50%.

As illustrated above, these poly-(2,6-diarylphenylene ethers) may be fabricated into useful articles such as films and fibers, especially those which are highly crystalline in nature. Those which are amorphous in nature and do not readily crystallize, such as those from the unsymmetrically substituted phenols, are readily molded into useful articles by well known techniques. The solutions of these polymers may be used to produce protective coatings which may be used for electrical insulation. The oriented films also may be used as electrical insulation, for example, as slot wedges in the armatures of electric motors, transformer coil spacers, etc. The fibers can be woven into fabrics useful in many applications, for example, as filter cloths where high chemical and heat resistance is desired. The polymers may also be mixed with various fillers, modifying agents, etc., such as dyes, pigments, stabilizers, plasticizers, etc. The oriented films may be fabricated in the form of insulating tapes, sound recording tapes, magnetic tapes, photographic films, pipe and wire tapes, etc.

Obviously, other modifications and variations of the present invention are possible in light of the above teaching. It is therefore to be understood that changes may be made in the particular embodiments of the invention described which are within the full intended scope of the invention as defined by the appended claims.

What I claim as new and desire to secure by Letters Patent of the United States is:

1. The process of producing a poly-(2,6-diaryl-1,4-phenylene ether) which comprises reacting oxygen with a 2,6-diarylphenol wherein one aryl substituent is phenyl and the other substituent is selected from the group consisting of phenyl, $C_{1-8}$ alkyl substituted phenyl, biphenylyl, terphenylyl and naphthyl using, as the oxygen-carrying intermediate, an amine-basic cupric salt complex having a nitrogen-to-copper ratio no greater than 5 to 1, said amine being selected from the group consisting of n-butylamine, di-n-butylamine, tri-n-butylamine, cyclohexylamine, p-menthane-1,8-diamine and amines having the formula

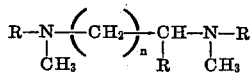

where R is selected from the group consisting of hydrogen and methyl and $n$ is an integer and is at least 1 and not more than 2, said reaction being carried out at a temperature in the range of 50–130° C. in a solution in which said phenol and said complex is dissolved and the water of reaction is essentially removed from the reaction mixture as fast as it is formed.

2. The process of claim 1 wherein the water of reaction is removed from the reaction mixture by distillation.

3. The process of claim 1 wherein benzene is used as a solvent and the water of reaction is removed from the reaction mixture by azeotropic distillation.

4. The process of claim 1 wherein the phenol is 2,6-diphenylphenol.

5. The process of claim 1 wherein the amine is a diamine.

6. The process of claim 1 wherein the amine is N,N,N',N'-tetramethylethylenediamine.

7. The process of claim 1 wherein the amine is N,N'-dimethyl-1,3-propanediamine.

8. The process of claim 1 wherein the amine is N,N,N',N'-tetramethyl-1,3-butanediamine.

9. The process of claim 1 wherein the amine is N,N,N',N'-tetramethyl-1,2-propanediamine.

10. The process of claim 1 wherein the phenol is 2,6-diphenylphenol, benzene is used as the solvent and the oxygen carrying intermediate is made from cuprous bromide and a diamine and the water of reaction is removed from the reaction mixture by azeotropic distillation.

References Cited

UNITED STATES PATENTS

| | | | |
|---|---|---|---|
| 3,306,874 | 2/1967 | Hay | 260—47 |
| 3,306,875 | 2/1967 | Hay | 260—47 |

WILLIAM H. SHORT, *Primary Examiner.*

M. GOLDSTEIN, *Assistant Examiner.*

U.S. Cl. X.R.

260—33.6, 33.8; 210—503; 264—203, 205, 210, 211, 216, 291, 289, 290